Oct. 20, 1970     V. L. JOHNSON     3,534,622

REVERSIBLE PITCH V-BELT PULLEY

Filed Jan. 13, 1969     3 Sheets-Sheet 1

INVENTOR.
VERNON L. JOHNSON
BY
Attorneys

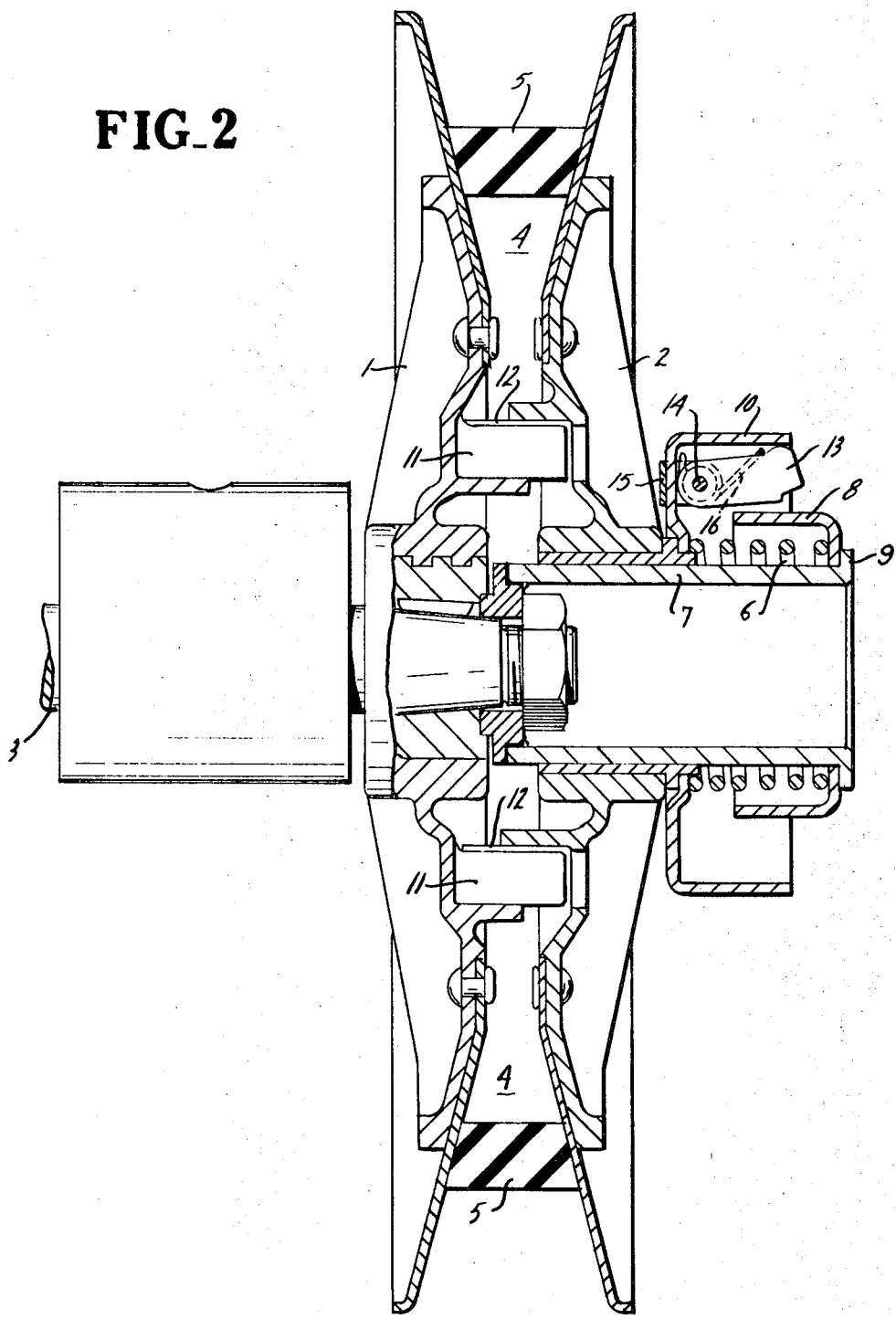

Oct. 20, 1970     V. L. JOHNSON     3,534,622
REVERSIBLE PITCH V-BELT PULLEY
Filed Jan. 13, 1969     3 Sheets-Sheet 3
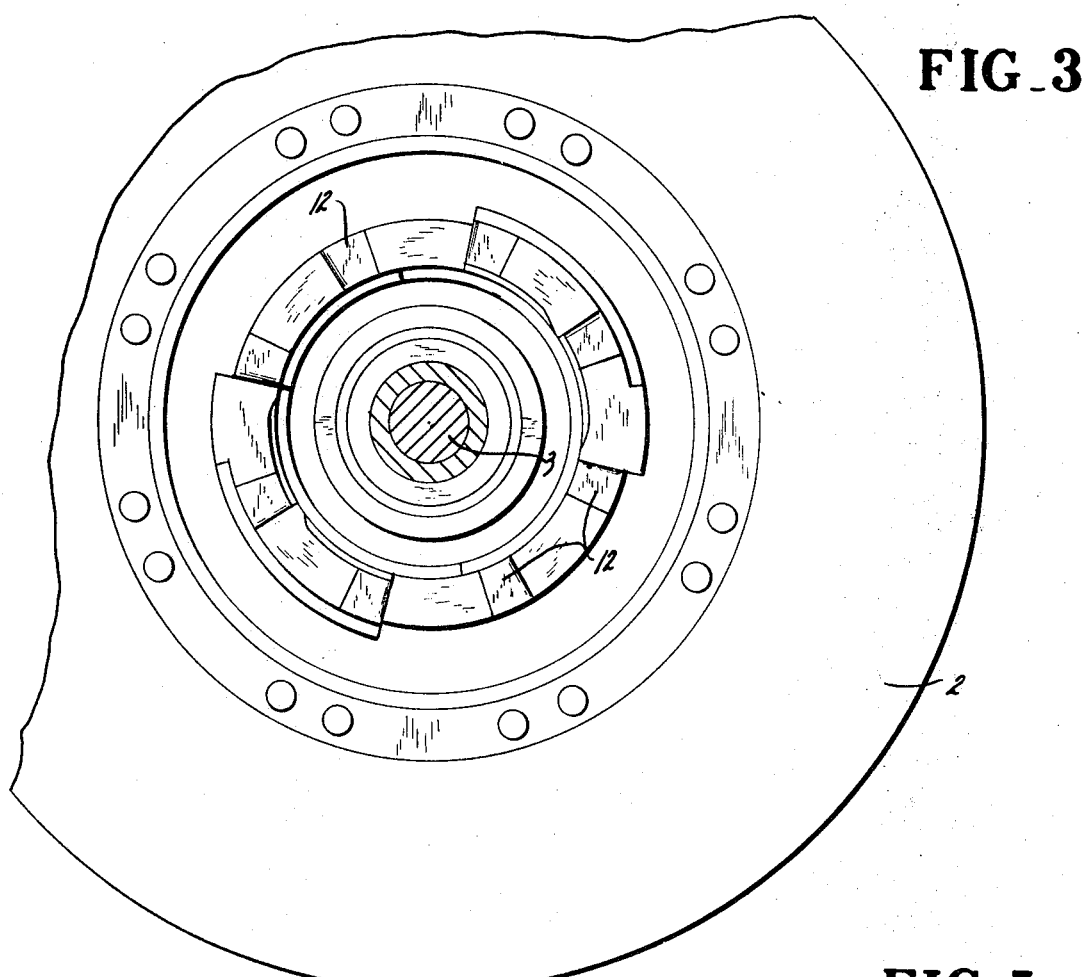
FIG_3
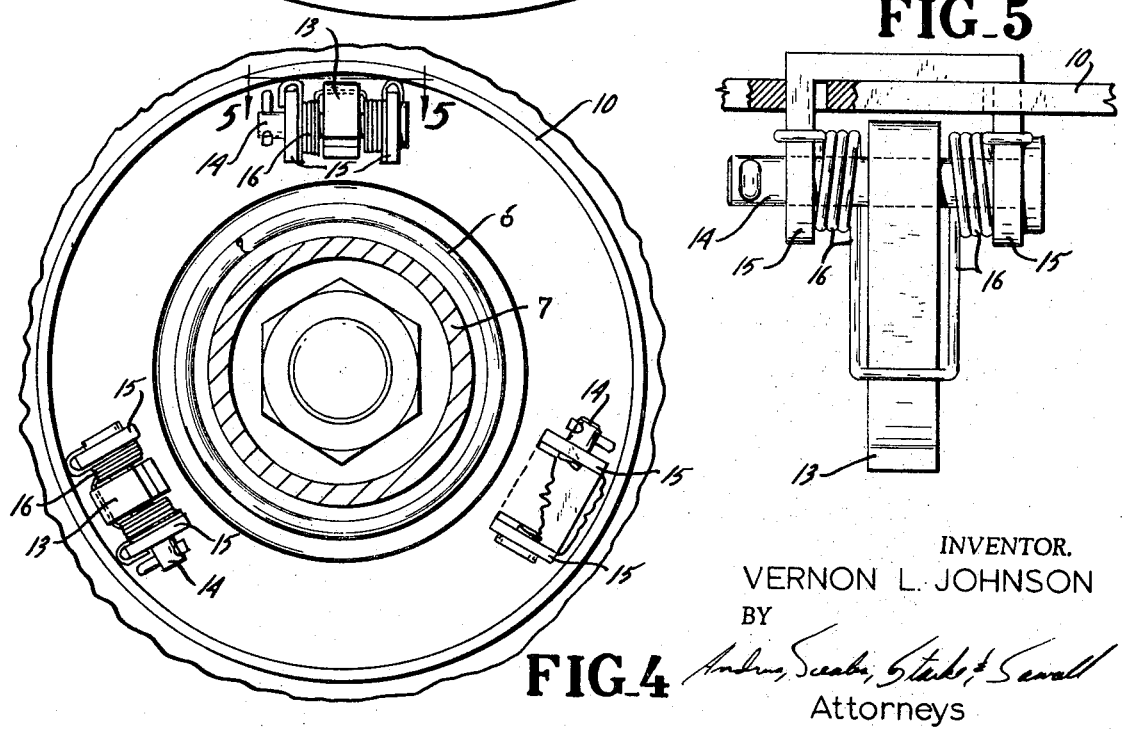
FIG_4    FIG_5
INVENTOR.
VERNON L. JOHNSON
BY
Attorneys

United States Patent Office 3,534,622
Patented Oct. 20, 1970

3,534,622
REVERSIBLE PITCH V-BELT PULLEY
Vernon L. Johnson, Fond du Lac, Wis., assignor to Brunswick Corporation, Chicago, Ill., a corporation of Delaware
Filed Jan. 13, 1969, Ser. No. 790,612
Int. Cl. F16h 55/56
U.S. Cl. 74—230.17                                   8 Claims

ABSTRACT OF THE DISCLOSURE

A variable pitch V-belt pulley having a camming action to adjust the tightness of the pulley on the belt in accordance with the load, and in which the two separable halves are locked against separation when starting in forward and before a speed is developed that effects camming action, and when the direction of the drive is reversed in which the camming action reverses and tends to separate the halves.

---

This invention relates to a reversible variable pitch V-belt pulley wherein the belt is adapted to drive the pulley at different speeds and under different load conditions.

Most variable pitch pulleys provide a camming action between the two halves of the pulley to automatically compensate for the load and prevent excessive wear on the belt under conditions of reduced load. Where a reverse drive is needed it has been the practice heretofore to employ a reverse gear mechanism between the V-belt drive and the load so that the V-belt drive is always operated in one direction for both forward and reverse movement of the load.

The present invention makes it possible to eliminate the reverse gear mechanism by employing a reversible power source and providing a construction for the variable pitch V-belt pulley that prevents undue separation of the two halves of the pulley when reversed by the power source. The construction additionally prevents separation of the sheave halves when starting in forward and before the intended speed is developed for the cams to function.

Various means may be provided for this purpose, that illustrated herein and which is preferred being a centrifugally actuated lock against separation of the two halves of the pulley. In this preferred construction the axially movable pulley half carries one or more pivotally mounted lockout bars which are normally disposed in alignment with and engageable with corresponding abutments on the shaft to prevent separation of the two pulley halves when rotating in a reverse direction. The lockout bars are susceptible to outward pivotal action under centrifugal action at higher forward speeds whereby they do not engage their corresponding abutments and the two pulley halves may separate as needed to compensate for varying load conditions within the limits provided by the camming action.

The preferred embodiment of the invention is illustrated in the accompanying drawing in which:

FIG. 2 is a view similar to FIG. 1 showing the parts in a position of medium or high speed forward drive;

FIG. 3 is a reduced transverse section taken centrally between the two pulley halves generally on line 3—3 of FIG. 1;

FIG. 4 is a transverse section taken on line 4—4 of FIG. 1 and showing the arrangement of the lockout bars in the outer cup for the return spring for the sheave; and FIG. 5 is a fragmentary view of a portion of FIG. 4 taken on line 5—5.

Figure 1:
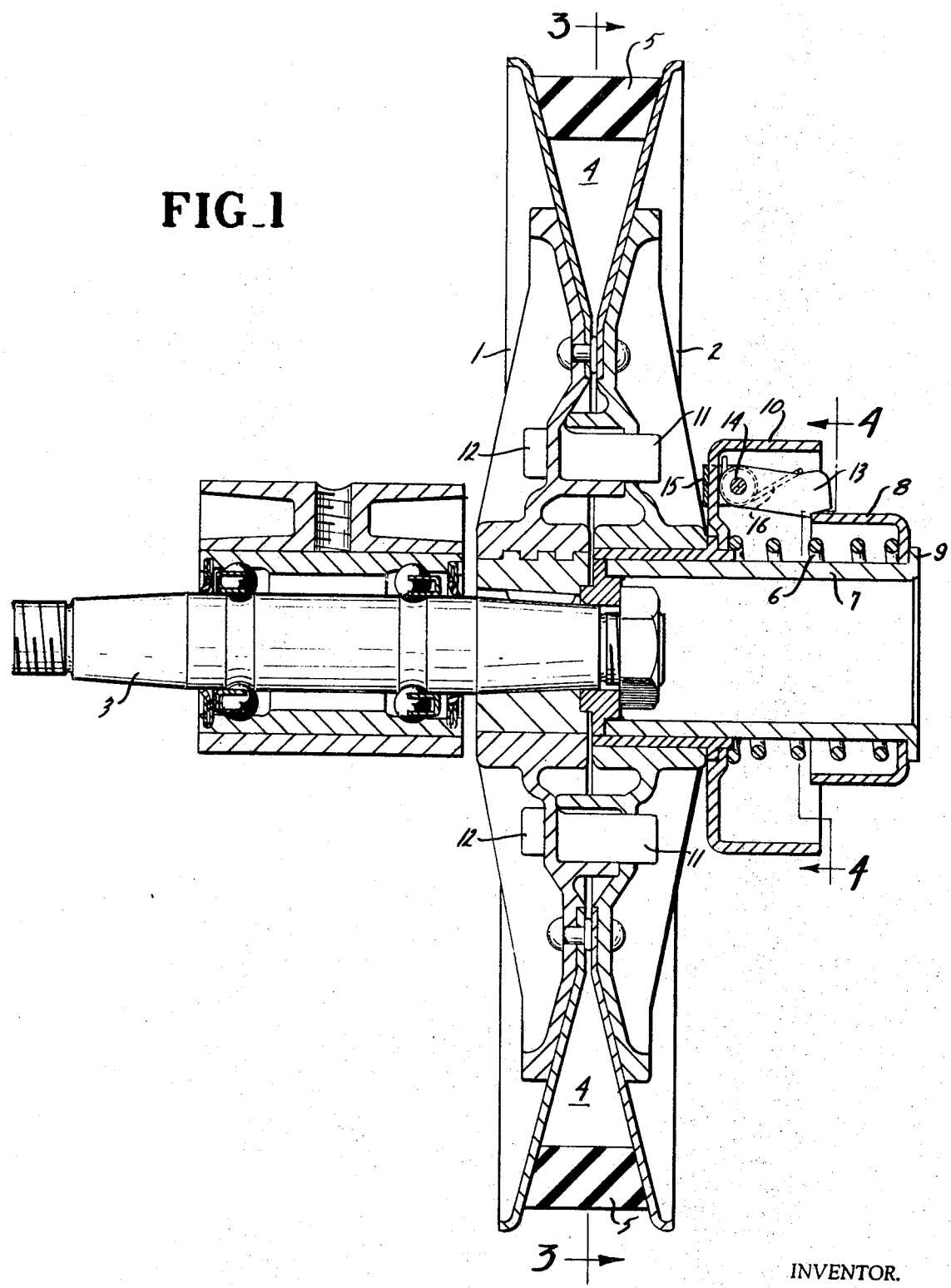
FIG. 1 is an axial section showing the details of the pulley construction and its mounting.

The pulley comprises two relatively moveable circular halves 1 and 2, the member 1 being fixed on the driven shaft 3, and the member 2 being mounted free to rotate a limited amount on the shaft 3 and movable axially relative to member 1.

The two halves 1 and 2 provide a circumferential V-groove 4 therebetween for receiving the usual V-belt 5 for driving the same.

The sliding half 2 is biased toward the fixed half 1 by means of a coil spring 6 encircling an adapter sleeve 7 and which is confined in a housing comprising an inner cup 8, the base of which is pressed by the spring 6 against a flange 9 on the outer end of the adapter 7, and an outer cup 10, the base of which is pressed by the spring 6 against member 2.

The cups 8 and 10 face each other and outer cup 10 is substantially larger in diameter than inner cup 8 so that the latter telescopes within cup 10 when the two halves 1 and 2 separate, as shown in FIG. 2.

The construction employs a camming action to force the pulley member 2 axially toward pulley member 1 as the load increases. For this purpose each pulley half 1 and 2 carries a plurality of helically disposed cam elements, the cam elements 11 on half member 1 being adapted to engage corresponding cam elements 12 on half member 2.

By properly designing the cam elements 11 and 12, the force exerted between the belt and pulley can match the force needed to transmit the power without slippage. The spring 6 is relatively light in compression, but should be sufficiently heavy and may preferably be a torsion spring to return the parts to normal position upon stopping of the drive.

However, when it is desired to reverse the drive, the belt and also the camming action tend to separate the pulley halves 1 and 2 and to thereby release the belt. For the purpose of preventing this, to maintain a reasonable tight belt connection, and to lock said pulley halves in a close together position (as shown in FIG. 1), the present invention provides a lock against separation of the pulley halves in reverse.

The lock illustrated comprises a plurality of circumferentially spaced lockout bars 13 carried by the outer cup 10 as by individual transverse pivot pins 14 mounted in corresponding lugs 15 in the cup. A suitable spring 16 biases each of the lockout bars 13 inwardly in line with the outer edge of the inner cup 8. Thus, when the drive is reversed and pulley half 2 moves outwardly at a slow rotational speed away from pulley half 1, the lockout bars will abut the edge of the cup 8 and prevent further separation of the pulley halves 1 and 2. This abutment of the lockout bars will be maintained by reason of both the bolt and the cams tending to separate the halves and thereby biasing the bars 13 against the abutment 8.

Thus, in reverse, the belt is maintained in the outer portion of the groove 4 and a greater power ratio is attained corresponding to that in low gear for a multispeed gear transmission.

Upon normal forward drive movement, the lockout bars 13 are centrifugally moved outwardly about the pivot pins 14 beyond the position where they would engage with the cup 8, since in forward drive a much higher speed develops before the pulley half 2 begins to move axially outwardly. However, upon commencement of forward movement and before the vehicle obtains a speed at which the cams 11 and 12 are activated, the lockout bars 13 abut cup 8 and prevent uncontrolled movement of the sheave half 2 by the initial force the belt imposes on the sheave halves 1 and 2.

The subject matter presently regarded as the invention is particularly pointed out and distinctly claimed as follows:

1. A reversible variable pitch V-pulley having axially separable pulley halves with camming means tending to force the halves toward each other to grip the belt in response to the load thereon in a forward drive direction, and means for locking said pulley halves in a close together position, said locking means being releasable in a forward drive direction in response to rotational speed of the pulley.

2. The construction of claim 1 in which said camming means comprises a plurality of circumferentially spaced cam elements on each of said pulley halves, with the cam elements on one pulley half opposed to and engaging the corresponding cam elements on the other pulley half, and said engaging cam elements being arranged helically coaxial with said pulley.

3. The construction of claim 2 in which said locking means comprises cooperative abutment means fixed relative to the corresponding pulley halves and adapted to engage each other upon initial separation of the pulley halves.

4. The construction of claim 3 in which said abutment means comprises a pivotally mounted centrifugally movable member adapted to swing out of alignment with its corresponding abutment upon high speed forward drive of the pulley whereby the pulley is free to vary the pitch for the V-belt during forward drive without interference by the abutment.

5. The construction of claim 1 in which said locking means comprises cooperative abutment means fixed relative to the corresponding pulley halves and adapted to engage each other upon initial separation of the pulley halves.

6. The construction of claim 5 in which said abutment means comprises a pivotally mounted centrigugally movable member adapted to swing out of alignment with its corresponding abutment upon high speed forward drive of the pulley whereby the pulley is free to vary the pitch for the V-belt during forward drive without interference by the abutment.

7. A variable pitch V-belt pulley having axially separable pulley halves with camming means tending to force the halves toward each other to grip the belt in response on the load thereon in a forward drive direction, and releasable means for locking said pulley halves in a close together position upon initiation of forward drive and prior to such camming action.

8. In a variable pitch V-belt pulley having axially separable pulley halves with camming means tending to force the halves toward each other to grip the belt in response to the load thereon in a forward drive direction and resilient means for biasing one said half toward the other said half, the improvement comprising releasable means for locking said pulley halves in a close together position.

References Cited
UNITED STATES PATENTS

| | | | |
|---|---|---|---|
| 3,161,071 | 12/1964 | Getz | 74—230.17 XR |
| 3,269,202 | 8/1966 | Getz et al. | 74—230.17 |

JAMES A. WONG, Primary Examiner.